United States Patent [19]

Smith

[11] Patent Number: 5,122,007

[45] Date of Patent: Jun. 16, 1992

[54] PULLING EYE WITH BREAKAWAY

[76] Inventor: Jackson A. Smith, P.O. Box 1058, Aldergrove, British Columbia, Canada, V0X 1A0

[21] Appl. No.: 585,649

[22] Filed: Sep. 19, 1990

[51] Int. Cl.⁵ .............................................. F16D 9/00
[52] U.S. Cl. ...................................... 403/2; 403/165; 403/379
[58] Field of Search ................... 403/2, DIG. 3, 378, 403/379, 165, 78; 411/4, 916; 24/115 F; 285/2, 4

[56] References Cited

U.S. PATENT DOCUMENTS

| | | |
|---|---|---|
| 2,387,599 | 10/1945 | Miller et al. |
| 2,429,929 | 10/1947 | Fisher |
| 2,480,662 | 8/1949 | McKinzie |
| 2,633,375 | 3/1953 | Wilcoxon |
| 3,490,799 | 1/1970 | Shreeve ................. 403/379 X |
| 3,922,104 | 11/1975 | McCullough ............. 285/2 X |
| 3,960,456 | 6/1976 | Norris .................... 403/2 X |
| 3,982,847 | 9/1976 | Kawase et al. ............ 403/2 X |
| 4,308,419 | 12/1981 | Fredriksson |
| 4,330,926 | 5/1982 | McCall ................... 403/2 X |
| 4,687,365 | 8/1987 | Promersberger ........... 403/2 |

OTHER PUBLICATIONS

Brochure from TSI International Inc. entitled "TSE--Pengo/Miller Line Stringing Swivels".

Primary Examiner—Andrew V. Kundrat
Attorney, Agent, or Firm—Vidas & Arrett

[57] ABSTRACT

An improved cable pulling eye including breakaway protection. The cable pulling eye includes a main body having a female end and a second body with a male end which may be inserted together. The bodies are held together by a breakaway pin passing through the male shaft and the walls of the second body. The pin includes spaced annular grooves as weak points where breakage is limited and will occur.

5 Claims, 2 Drawing Sheets

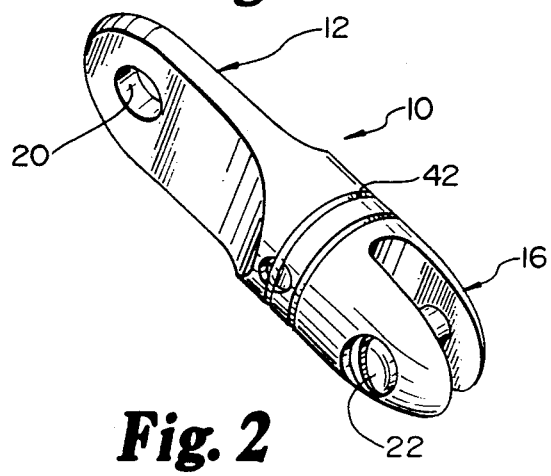
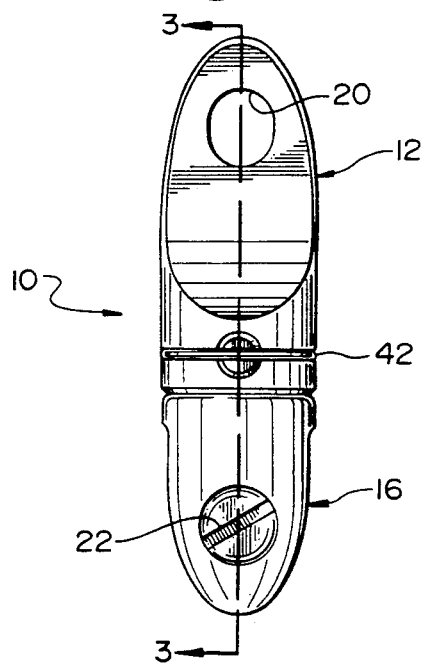
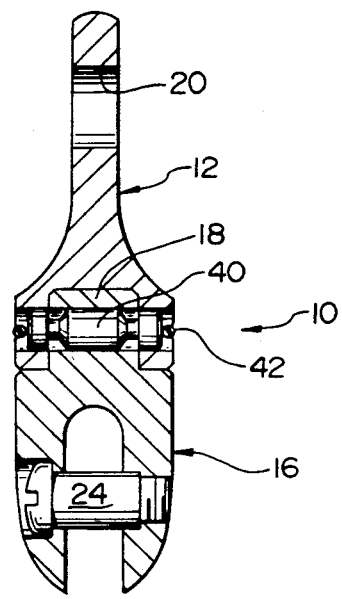
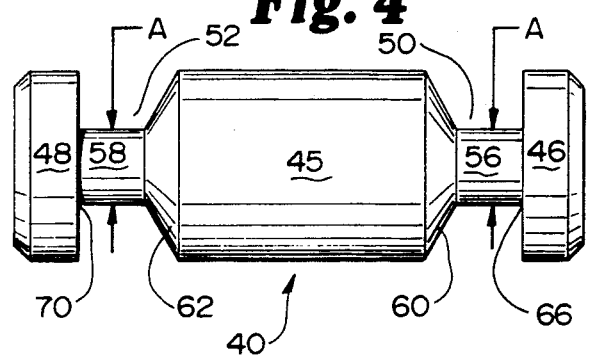
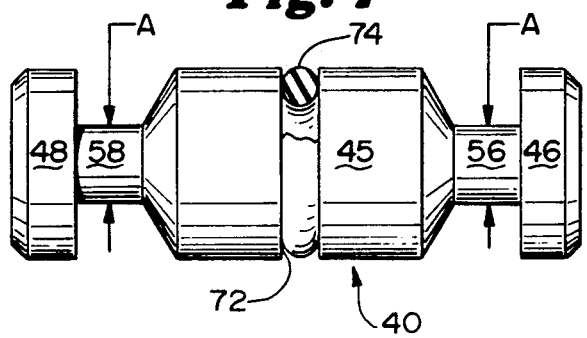
| A | LOAD |
|---|---|
| .0580 | 200 |
| .0800 | 400 |
| .1035 | 600 |
| .1135 | 800 |
| .1230 | 1000 |
| .1335 | 1200 |
| .1435 | 1400 |
| .1495 | 1600 |
| .1580 | 1800 |
| .1650 | 2000 |

PULLING EYE WITH BREAKAWAY

BACKGROUND OF THE INVENTION

1. Field of the Invention

This invention relates to pulling eyes of the type used for pulling optic and electrical cable, and more specifically to pulling eyes with a breakaway point. The breakaway feature prevents damage to the cables being pulled if the force is greater than the design.

2. Description of the Related Art

Pulling eyes of the swivel and non-swivel type have been built including break-away features. In U.S. Pat. No. 4,687,365 to Promersberger, a swivel is shown in which breakaway protection is created by a central load pin. That pin is oriented in the longitudinal axis of the device and may include a necked down region to decrease its breaking strength. The pin is threaded into the body of the device. When breakage occurs, it may be quite difficult to remove if the threads have smeared and welded the pin to the body.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

SUMMARY OF THE INVENTION

The invention provides a cable pulling device which is load limited such that the device will fail before a load is placed on the cable being pulled which is too high. In many applications, it is possible to place a greater pulling load on a cable than the rating of the cable. As a consequence, some or all of the cable strands may weaken or break. With electrical or fiber optic cables, such loads must never be applied or the pulled cable may be worthless. Accordingly, a load limiter of some sort is highly desirable.

As always, a product such as a cable puller should be dependable, easy to use and economical. The cable puller of the invention provides all of these features. The cable connector consists of two main sections, a main body with a female end and a secondary body with a male end.

Both bodies include a pulling eye. The male end of the secondary body is inserted into the female end of the main body. A passageway is formed through the main body and male end such that a pin may be inserted from the exterior of the main body through the passageway to couple the bodies together.

The pin connecting the two bodies is the weak link which provides the load limiting function. It includes two spaced annular grooves cut into it which are spaced such that the distance between the grooves is equal to the diameter of the male end. In this way, the weakest portion of the pin actually resides within the male end passageway up to the interface between the two bodies. Failure of the pin will occur at the intersection or within the male end. The pin will not shear across the interface to allow smearing of metal which could freeze the bodies together. Rather, the bodies will part cleanly without jamming the pin in either body passageway.

Such a construction allows the rapid reuse of the bodies forming the device since there is no need to drill out the passageways to remove a sheared and smeared pin. With a straight pin having no grooves, the shear may occur across the interface, leaving metal to smear across the surface of both bodies when they separate. The ragged ends of the sheared pins deform and seal the pin sections to the passageways requiring either a difficult removal or discarding of the device.

BRIEF DESCRIPTION OF THE DRAWINGS

A detailed description of the invention is hereafter described with specific reference being made to the drawings in which:

FIG. 1 is a perspective view of the cable connector of the invention;

FIG. 2 is a right side elevational view thereof;

FIG. 3 is a section taken along line 3—3 in FIG. 2;

FIG. 4 is an enlarged detail view thereof showing the breakaway pin;

FIG. 5 is a table showing alternative dimensions A of FIG. 4 and respective break-away loads;

FIG. 7 is an enlarged detail view thereof showing the breakaway pin and a pin indicia scheme.

DESCRIPTION OF THE PREFERRED EMBODIMENTS

Figure 6:
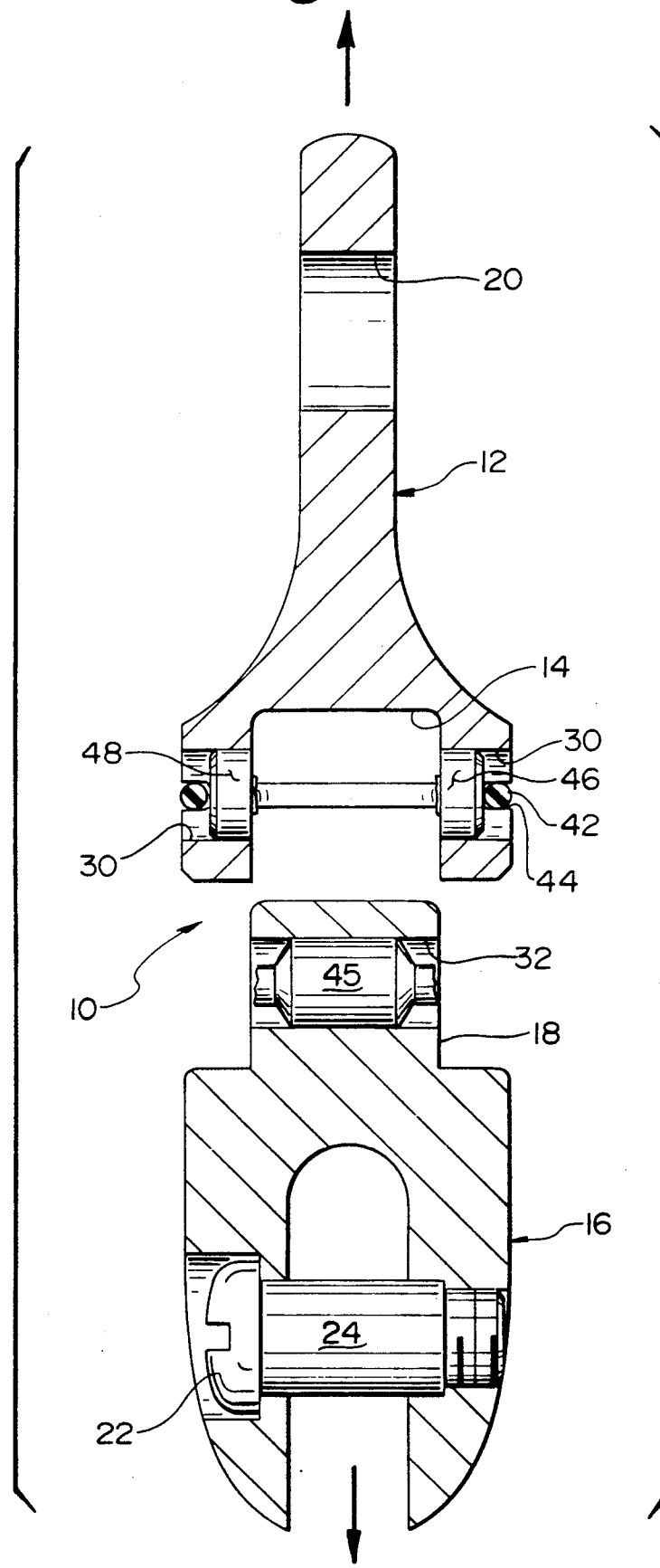
FIG. 6 is an exploded section of the cable connector with a shorn break away pin releasing the two bodies.

With reference to FIGS. 1-6, and particularly to FIG. 6, it will be seen that cable connector/puller 10 includes a main body 12 which includes a central bore 14. The second body 16 includes an elongated shaft 18 closely configured to engage with central bore 14 in a male-female part coupling.

Each body includes either a ring or clevis end to which a line or cable may be connected. As shown, main body 12 is formed to include a ring 20 at one end and second body 16 includes a clevis screw 22 to form a clevis connection 24. Both connecting point ends preferably have a paraboloid-like profile to make the device less capable of catching on something when being pulled.

Main body 12 also includes a passageway 30 from one side of the body to the other which passes through the central bore 14. Second body 16 includes an opening 32 through the shaft 18 which may be aligned with passageway 30 such that a breakaway pin 40 may be inserted.

Breakaway pin 40 provides the means for holding the main and second bodies together to form the completed device 10. When a breakaway pin 40 is inserted into the aligned path defined by passageway 30 and opening 32 the bodies are secured together as a unit. Preferably, the pin is kept within device 10 by an O-ring 42 which is snapped into an annular groove 44 formed in the main body 12 as shown. The O-ring construction is preferred since it is very simple and allows a different pin to be inserted quickly. Also, the O-ring makes the pin self-centering and provides some give when the pin shears. Other mechanisms for holding the pin 40 in place may be employed such as screws threaded into the passageways.

The breakaway pin 40 is specially designed to provide breakage at the load specified. It is also designed to minimize any metal (or other material if not metal) from smearing across the surfaces at the interface of the central bore and shaft when it breaks. Ordinary shear pins "shear" and smear metal at the interface of the passageways of the two parts. The smeared metal may reconnect the members and makes removal of the broken pin much more difficult. Often, it may be difficult to tell where the passageway is due to a smearing of metal over and beyond the passageway.

The pin of the invention includes a central core 45 and opposed heads 46, 48 which are of the same diameter. Two spaced annular grooves 50, 52 are formed in the pin 40 to provide a defined breakage area. Preferably, the grooves define a breakaway neck 56, 58 and sloping shoulders 60, 62. At the head, there is preferably a sharp transition zone 66, 70 from the breakaway neck to the head as shown in the drawings.

FIG. 5 shows load values for steel pins having a breakaway neck diameter as indicated. FIG. 6 depicts the breakage of the pin 40 when the load limit is exceeded. As can be seen, the breakage occurs at zones 66, 70 which are spaced such that they equal the diameter of the shaft 18. In this manner, the shearing action of the shaft and central bore interface is directly at the zones 66, 70. The weakest parts of the pin are immediately at the interface or inside the shaft 18. This insures that any breakage will occur at the interface and into the shaft — not across the interface of the central bore and shaft.

FIG. 7 shows the breakaway pin 40 modified to include a central groove 72 into which a colored O-ring 74 may be snapped. The color of the O-ring 74 may be chosen as indicating the break strength of the pin 40. It is therefore very easy to select the proper pin in a bin of mixed pins as the color stands out.

Very little of the material of the pin 40 is left attached to heads 46, 48. Thus, little metal is available to smear across the interface of the parts as they come apart. The remainder of the pin within opening 32 of the shaft 18 is not smeared across the parts. Rather, it is loosely within the opening and may be readily removed and readied for a different pin. This allows the device to be reused without the need to drill out a smeared pin. Grooves 50, 52 provide defined breakage points where breakage is directed an limited. The spacing ensures that the pin stubs may be readily removed.

The use of an O-ring 42 improves the performance of the device 10. The O-ring provides some flex or give when the pin 40 breaks, allowing the broken heads 46, 48 to move further out lessening any chance that they may smear against the interfacing walls of the main and second bodies.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A cable connector load limited to an approximate calibrated tension load value, comprising:
    a) a main body having first and second opposing ends, the first of said ends including cable connecting means, the second of said ends defining a central bore,
    b) a second body having fore and aft opposing ends, the fore end including cable connecting means, the aft end defining an elongated shaft constructed and arranged to closely fit within the central bore of said main body, said shaft including a passageway from one exterior surface to the opposing exterior surface;
    c) said second end of said main body including two openings through the exterior surface into said central bore, said openings being directly opposite one another such that a passageway is formed from one side of the main body to the other through which a breakaway pin may be inserted;
    d) a breakaway pin for insertion into the main body passageway and shaft passageway to lock the main body to the second body, said pin including two annular grooves spaced from each other such that the distance between the outboard ends of the grooves is equal to the diameter of said shaft, said grooves providing break points in the pin; and
    e) retainer means for preventing a breakaway pin from leaving the passageways formed in said main and second bodies such that an assembled device will stay together.

2. The cable connector of claim 1 wherein said retainer means includes an O-ring which is insertable into an annular groove connecting the exterior openings of said main body passageway.

3. The cable connector of claim 1 wherein said breakaway pin is constructed and arranged to include two spaced annular grooves cut into said pin such that the furthest distance between the grooves is equal to the diameter of said second body shaft such that shearing of said pin will occur inside the shaft passageway.

4. The cable connector of claim 3 wherein said grooves cut into said pin define a sharply defined transition zone between a head of said pin and a breakaway neck region.

5. A cable connector load limited to an approximate calibrated tension load value, comprising:
    a) a main body having first and second opposing ends, the first of said ends including cable connecting means, the second of said ends defining a central bore,
    b) a second body having fore and aft opposing ends, the fore end including cable connecting means, the aft end defining an elongated shaft constructed and arranged to closely fit within the central bore of said main body, said shaft including a passageway from one exterior surface to the opposing exterior surface;
    c) said second end of said main body including two openings through the exterior surface into said central bore, said openings being directly opposite one another such that a passageway is formed from one side of the main body to the other through which a breakaway pin may be inserted, said main body further including an annular groove connecting the exterior openings of said passageway and into which an O-ring may be inserted;
    d) a breakaway pin means for insertion into the main body passageway and shaft passageway to lock the main body to the second body, said pin including two annular grooves spaced from each other such that the distance between the grooves is equal to the diameter of said shaft, said grooves providing break points in the pin; and
    e) an O-ring snapped into the annular groove of said main body to prevent a breakaway pin from leaving the passageways formed in said main and second bodies such that an assembled device will stay together.

* * * * *